No. 719,661. PATENTED FEB. 3, 1903.
H. HALSEY.
ELECTRIC BATTERY.
APPLICATION FILED APR. 18, 1902.
NO MODEL.

WITNESSES:
Robert D. Ireland
Lester C. Taylor

INVENTOR
Henry Halsey
BY
C. W. Edwards
ATTORNEY.

# UNITED STATES PATENT OFFICE.

HENRY HALSEY, OF NEW YORK, N. Y., ASSIGNOR, BY MESNE ASSIGNMENTS, TO HALSEY ELECTRIC GENERATOR COMPANY, OF JERSEY CITY, NEW JERSEY, A CORPORATION OF NEW JERSEY.

ELECTRIC BATTERY.

SPECIFICATION forming part of Letters Patent No. 719,661, dated February 3, 1903.

Application filed April 18, 1902. Serial No. 103,643. (No model.)

*To all whom it may concern:*

Be it known that I, HENRY HALSEY, a citizen of the United States, residing at New York city, in the county of New York and State of New York, have invented certain new and useful Improvements in Electric Batteries, of which the following is a full, clear, and exact specification.

This invention relates to electric batteries; and its object is to provide a simple and efficient battery of the type wherein a movable element is employed.

The main objects of the present invention are to provide a simple means for maintaining constant movement between the electrolyte and the elements of the battery, to increase the working surface of the elements, and thus increase the capacity of the battery without increasing the size of the battery, and, further, to avoid the necessity of swiveled connections between the conductors and the elements of the battery.

The invention will be more fully described with reference to the form thereof shown in the accompanying drawings, in which—

Figure 1:
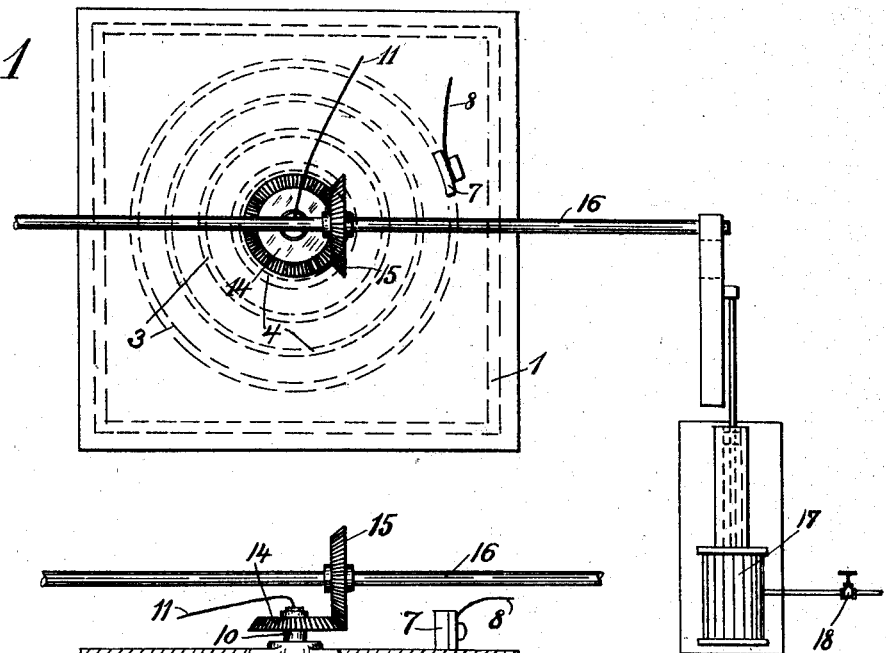
Figure 2:
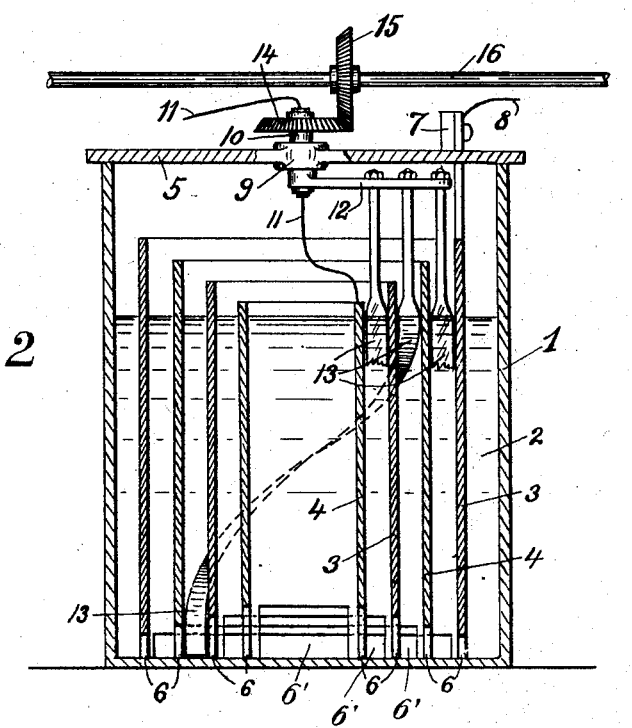

Figure 1 is a top view of a battery embodying my invention. Fig. 2 is a sectional view of the same.

In the drawings, 1 is a suitable cell containing the electrolyte 2.

3 and 4 are the respective elements resting upon the bottom of the cell or, if preferred, suitably suspended from the cover 5. Suitable means should be provided for permitting free circulation of the electrolyte between the respective elements.

In the drawings the elements are shown as provided with feet 6, the openings 6' 6' 6' between which permit suitable circulation of the electrolyte. The elements 3 are electrically connected together, and the conducting-strip 7 leads from this element through the top of the cover 5, at which place the conductor 8 is attached. In a suitable bearing 9 in the cover 5 is mounted a hollow shaft 10, through which shaft the conductor 11 passes to the element 4, to which it is attached. Upon the shaft 10 is rigidly mounted an arm 12, carrying one of the brushes 13, which brushes project downward into the spaces between the elements and are arranged to brush against the elements. Preferably the brushes are spirally formed, as shown in the drawings, although this is not essential. The spiral form is preferred, because it not only brushes the sides of the elements, but it also gives the electrolyte a downward movement, tending to stir the electrolyte and more evenly distribute it. The brushes preferably extend clear to the bottom of the cell in order that the end of the brush may brush against the bottom of the cell as well as the sides of the elements. Thereby precipitates are prevented from collecting in the bottom of the cell and operating to produce local action between the precipitates and the elements. The brushes 13 should of course be of non-corrosive material—such, for example, as hard rubber.

The gear-wheel 14, mounted on shaft 10, meshes with a gear-wheel 15 upon shaft 16. Shaft 16 is rotated by any suitable means—such, for example, as the steam-engine 17, the speed of which is controlled by the valve 18. If an electric motor be employed to drive shaft 16, it may be operated from an independent source or by current derived from the battery itself.

In the operation of the battery, the circuit 8 11 having been closed, the engine 17 is started, which revolves the shaft 16 and shaft 10, and this moves the brushes 13 around in the space between the elements, and thus continuously brushes the elements, and at the same time will of course move the liquid electrolyte around in the space between the elements. The electrolyte and the brushes thus continuously brush the elements and prevent polarization of the battery. It will be found in practice that if the rate at which the brushes are moved is reduced the output of the battery will be correspondingly reduced, and therefore the current from the battery may be varied without interposing resistance between the external circuit by merely varying the speed at which said brushes are revolved. It is to be understood, however, that I do not limit myself herein to the specific means of varying the curren herein shown, as any well-known means including resistance in the external circuit may be employed.

By reason of the concentric arrangement of the elements it is possible to employ in one battery a large number of elements. In the present instance two pairs of elements are shown, the like elements of the respective pairs being connected with each other.

Having thus described my invention, I declare that what I claim as new, and desire to secure by Letters Patent, is—

1. In a battery, the combination of a plurality of concentrically-arranged elements, an electrolyte between the same, a brush in said electrolyte, and means for moving the brush around the channel between the elements, substantially as described.

2. In a battery, the combination of a plurality of concentrically-arranged elements, an electrolyte between the same, a brush in said electrolyte contacting with said elements, and means for moving said brush around in the channel between the elements, substantially as described.

3. In a battery the combination of a plurality of concentrically-arranged elements, an electrolyte between the same, a spiral brush in said electrolyte surrounding the inner element, and means for moving said brush around the channel between the elements, substantially as described.

4. In a battery, the combination of a plurality of concentrically-arranged elements, an electrolyte between the said elements, a spiral brush surrounding the inner element and reaching to the bottom of the cell, and means for moving the brush around the space between the elements, substantially as described.

5. In a battery, the combination of a plurality of cylindrical elements concentrically arranged and resting upon the bottom of said casing, the cover for said casing, and shaft vertically mounted in said cover, one or more brushes carried by said arm and projecting into the space between said elements, and means for rotating said shaft, substantially as described.

6. In a battery, the combination of a plurality of concentrically-arranged elements, an electrolyte between the same, a brush in said electrolyte, means for moving the brush around the channel between the elements, and means for varying the rate of movement of said brush, substantially as described.

7. In a battery, the combination of a plurality of concentrically-arranged elements, an electrolyte between the same, a brush in said electrolyte contacting with said elements, means for moving said brush around in the channel between the elements, and means for maintaining the movement of said brush at a determined rate of speed, substantially as described.

8. In a battery, the combination of a plurality of concentrically-arranged elements, an electrolyte between the same, a spiral brush in said electrolyte surrounding the inner element, means for moving said brush around the channel between the elements, and means for varying the rate of speed of said moving means, substantially as described.

9. In a battery, the combination with the electrolyte and the elements, of a spiral brush, and means for moving the same in the electrolyte, substantially as described.

10. In a battery, the combination with the electrolyte and the elements, of a horizontally-pivoted arm, one or more spiral brushes attached to the end of said arm and projecting into the electrolyte, and means for rotating said arm, substantially as described.

11. In a battery, the combination with the electrolyte and the elements, one of said elements being cylindrical in shape, of an arm pivoted at one end of said element, a spiral brush attached to the end of said arm and surrounding said element, and means for moving said arm upon its pivot, substantially as described.

In testimony whereof I affix my signature in presence of two witnesses.

HENRY HALSEY.

Witnesses:
HENRY BEST,
C. V. EDWARDS.